(12) United States Patent
Kataoka et al.

(10) Patent No.: US 10,577,477 B2
(45) Date of Patent: Mar. 3, 2020

(54) URETHANE CURABLE COMPOSITION

(71) Applicant: NOF CORPORATION, Tokyo (JP)

(72) Inventors: Shingo Kataoka, Aichi (JP); Yasushi Sugihara, Aichi (JP); Yuto Ichihara, Aichi (JP)

(73) Assignee: NOF Corporation, Tokyo (JP)

( * ) Notice: Subject to any disclaimer, the term of this patent is extended or adjusted under 35 U.S.C. 154(b) by 23 days.

(21) Appl. No.: 14/434,092

(22) PCT Filed: Mar. 18, 2014

(86) PCT No.: PCT/JP2014/057261
§ 371 (c)(1),
(2) Date: Apr. 7, 2015

(87) PCT Pub. No.: WO2014/156810
PCT Pub. Date: Oct. 2, 2014

(65) Prior Publication Data
US 2016/0002437 A1    Jan. 7, 2016

(30) Foreign Application Priority Data

Mar. 25, 2013 (JP) ................................ 2013-062033

(51) Int. Cl.
| | |
|---|---|
| *C08K 3/36* | (2006.01) |
| *C08G 18/22* | (2006.01) |
| *C08G 18/44* | (2006.01) |
| *C08G 18/62* | (2006.01) |
| *C08G 18/78* | (2006.01) |
| *C08G 18/79* | (2006.01) |

(52) U.S. Cl.
CPC .............. *C08K 3/36* (2013.01); *C08G 18/225* (2013.01); *C08G 18/44* (2013.01); *C08G 18/6229* (2013.01); *C08G 18/7831* (2013.01); *C08G 18/792* (2013.01)

(58) Field of Classification Search
CPC .. C08K 3/36; C08G 18/6229; C08G 18/7831; C08G 18/792; C08G 18/225; C08G 18/44
See application file for complete search history.

(56) References Cited

U.S. PATENT DOCUMENTS

| | | | | |
|---|---|---|---|---|
| 4,716,182 A * | 12/1987 | Hess | ..................... | C08G 18/707 521/163 |
| 4,720,519 A | 1/1988 | Orywol et al. | | |
| 4,900,776 A * | 2/1990 | Bock | ..................... | C08G 18/225 524/700 |
| 5,010,133 A | 4/1991 | Seville | | |
| 5,061,749 A | 10/1991 | Ito et al. | | |
| 5,952,053 A * | 9/1999 | Colby | ..................... | C08G 18/16 427/393 |
| 2003/0027917 A1* | 2/2003 | Namiki | ..................... | C08G 18/10 524/492 |
| 2008/0160289 A1 | 7/2008 | Lin | | |
| 2009/0005517 A1 | 1/2009 | Bleys et al. | | |
| 2010/0031603 A1* | 2/2010 | Letts | ..................... | B32B 27/40 52/745.06 |
| 2010/0059179 A1* | 3/2010 | Tribelhorn | ..................... | C08G 18/10 156/314 |
| 2010/0292384 A1 | 11/2010 | Igarashi et al. | | |
| 2011/0266497 A1* | 11/2011 | Eling | ..................... | B82Y 30/00 252/182.14 |
| 2012/0041142 A1* | 2/2012 | Nennemann | ..................... | B82Y 30/00 524/590 |

FOREIGN PATENT DOCUMENTS

| | | |
|---|---|---|
| CN | 1751097 A | 3/2006 |
| JP | S61-211321 A | 9/1986 |
| JP | S62-41214 A | 2/1987 |
| JP | H03-62879 A | 3/1991 |
| JP | H04-502035 A | 4/1992 |
| JP | 2002-327146 A | 11/2002 |
| JP | 2003-137955 A | 5/2003 |
| JP | 2007-039538 A | 2/2007 |
| JP | 2009-527585 A | 7/2009 |
| JP | 2009-539603 A | 11/2009 |
| JP | 2010-189477 A | 9/2010 |
| JP | 2012-021111 A | 2/2012 |

OTHER PUBLICATIONS

Chinese Office Action and English Translation for application No. 201480002474.8, dated May 25, 2016 (11 pages).
JP 2013-062033 Office Action with English translation, dated Oct. 21, 2014, 6 pgs.
PC International Search Report with English translation for PCT/JP2014/057261, dated Jun. 24, 2014, 5 pgs.
Extended European Search Report dated Oct. 31, 2016 for EP Application No. 14774736.4, 6 pgs.
Chinese Office Action for Application No. 201480002478.8, dated Feb. 23, 2017 and English Translation (13 pgs. total: CN Office Action—6 pgs; Translation—7 pgs).
Taiwan Office Action for Application No. 103110813, dated Feb. 6, 2017 and English Translation (10 pgs. total—TW Office Action—5 pgs; Translation—5 pgs).

(Continued)

*Primary Examiner* — Patrick D Niland
(74) *Attorney, Agent, or Firm* — Patterson Thuente Pedersen, P.A.

(57) ABSTRACT

Provided is a urethane curable composition including: a catalyst (a); a polyol (b) having two or more hydroxyl groups in one molecule; a polyisocyanate (c) having two or more isocyanate groups in one molecule; and silica particles (d) at a predetermined ratio, in which the catalyst (a) is a metal carboxylate represented by a formula (1):

$$M(OCOR)_n \quad (1)$$

where M represents Li, Na, K, Rb, Cs, Mg, Ca, Sr, Ba, Mn, Fe, Co, Ni, Cu, Zn, or Pb; R represents any one of a saturated hydrocarbon group having 1 to 20 carbon atoms, a branched unsaturated hydrocarbon group, an alicyclic hydrocarbon group, and an aromatic hydrocarbon group; and n represents the same number as a valence of M.

4 Claims, No Drawings

(56) References Cited

OTHER PUBLICATIONS

Indian Office Action for Application No. P00201503859, dated May 25, 2018 (2 pgs.) and English Language Translation (2 pgs.) (4 pgs. total).
Indonesian Office Action for Application No. P00201503859, dated May 25, 2018 (2 pgs.) and English Language Translation (2 pgs.) (4 pgs. total).
Indian Office Action for Application No. 2572/DELNP/2015, dated Nov. 1, 2018 (5 pgs).

* cited by examiner

URETHANE CURABLE COMPOSITION

RELATED APPLICATIONS

The present application is a National Phase entry of, and claims priority to, PCT Application No. PCT/JP2014/057261, filed Mar. 18, 2014, which claims priority to Japanese Patent Application No. 2013-062033, filed Mar. 25, 2013, both of which are incorporated herein in their entireties by reference.

BACKGROUND OF THE INVENTION

The present invention relates to a urethane curable composition containing a catalyst, polyol, polyisocyanate, and silica particles.

Commodity plastics such as acrylic resins, polycarbonate resins, polystyrene resins, and ABS resins are used in various fields because plastic molding is easily performed and they are light-weight and are superior in impact resistance. However, molded articles formed of these resins have, for example, poor scratch resistance and wear resistance on surfaces thereof as compared to glass and the like, and thus the appearance and functions thereof are likely to deteriorate when scratched by a nail or when damaged or depressed due to contact or impact of dust, pebbles, and the like. In order to solve these problems, a method of coating a surface of a resin molded article with a coating film having superior scratch resistance to protect the surface is generally used, and various curable compositions having such a function have been proposed. Among these, curable compositions using a urethanization reaction between polyol and polyisocyanate are suitable for thermal curing at a low temperature at which a resin molded article is not thermally deformed and for short-time curing, and various compositions have been proposed.

Among these urethane curable compositions, coating films containing a urethane curable composition and silica particles have high surface hardness and are superior in scratch resistance, and thus various compositions have been proposed (for example, Japanese Unexamined Patent Publication Application No. 2002-327146, Japanese Unexamined Patent Application Publication (Translation of PCT Application) No. 2009-539603, Japanese Unexamined Patent Publication Application No. 2010-189477, and Japanese Unexamined Patent Publication Application No. 2012-21111).

On the other hand, examples of a catalyst of a urethanization reaction between a hydroxyl group and isocyanate include metal compounds such as dibutyltin dilaurate, tin octylate, and lead naphthenate and salts thereof (F. Hostettler, E. F. Cox, Ind. Eng. Chem., 52, 609 (1960)); metal chelate compounds such as zirconium tetra acetylacetonate and titanium diisopropoxy bis(ethyl acetoacetate); and organic amines such as triethylenediamine, triethylamine, and tri-n-butylamine (J. Burkus, J. Org. Chem., 26, 779 (1961)) and salts thereof (Japanese Unexamined Patent Publication Application No. 60-240415). Among these, in particular, a dialkyltin compound such as dibutyltin dilaurate is generally widely used due to its high catalytic activity performance.

However, an acidic material such as silica particles having the same chemical structure as that of silica gel is known as a catalyst deactivating agent of a urethanization reaction between a hydroxyl group and an isocyanate group or an isocyanurating reaction between isocyanate groups (Japanese Unexamined Patent Publication Application No. 08-027123). In a urethane curable composition containing such an acidic material, it is difficult to make a curing reaction progress sufficiently. Accordingly, there has been a need for an improved urethane curable composition.

BRIEF SUMMARY OF THE INVENTION

According to an aspect of the present invention, there is provided a urethane curable composition including: a catalyst (a); a polyol (b) having two or more hydroxyl groups in one molecule; a polyisocyanate (c) having two or more isocyanate groups in one molecule; and silica particles (d), in which the catalyst (a) is a metal carboxylate represented by a formula (1):

where M represents Li, Na, K, Rb, Cs, Mg, Ca, Sr, Ba, Mn, Fe, Co, Ni, Cu, Zn, or Pb; R represents any one of a saturated hydrocarbon group having 1 to 20 carbon atoms, a chain unsaturated hydrocarbon group, an alicyclic hydrocarbon group, and an aromatic hydrocarbon group; and n represents the same number as a valence of M, a content of the polyol (b) is 5 wt % to 90 wt % and a content of the silica particles (d) is 5wt % to 85 wt % with respect to the total weight of the components (b) to (d), the polyisocyanate (c) is added such that an equivalence ratio (NCO/OH) of the isocyanate groups of the polyisocyanate (c) to the hydroxyl groups of the polyol (b) is 0.25 to 5.0, and a content of the catalyst (a) is 0.1 wt % to 2.0 wt % with respect to the content of the silica particles (d). Further, it is preferable that M represents Li, Na, K, Rb, or Cs.

In the urethane curable composition according to the present invention, a curing reaction progresses sufficiently under curing conditions: a thermal deformation temperature or lower of a commodity plastic molded article; and a short period of time of several tens of minutes. In addition, when M represents Li, Na, K, Rb, or Cs which is an alkali metal, a urethane curable composition which is superior in environmental safety and working life (so-called pot life) can be provided.

DETAILED DESCRIPTION OF THE DRAWINGS

A urethane curable composition according to the present invention is a composition containing a catalyst (a), a polyol (b), a polyisocyanate (c), and silica particles (d).

(a) Catalyst

The catalyst used in the present invention is a component for promoting a urethanization reaction between a hydroxyl group and an isocyanate group. This catalyst has a function of causing a urethane curable composition containing silica particles to be cured at a lower temperature for a shorter period of time as compared to other urethanization catalysts, and promotes a reaction between isocyanate groups. The catalyst used in the present invention is a metal carboxylate represented by the following formula (1):

where M represents Li, Na, K, Rb, Cs, Mg, Ca, Sr, Ba, Mn, Fe, Co, Ni, Cu, Zn, or Pb; R represents any one of a saturated hydrocarbon group having 1 to 20 carbon atoms, a chain unsaturated hydrocarbon group, an alicyclic hydrocarbon group, and an aromatic hydrocarbon group; and n represents the same number as a valence of M.

The metal carboxylate includes a carboxylic acid having any one of a saturated hydrocarbon group, a chain unsaturated hydrocarbon group, an alicyclic hydrocarbon group, and an aromatic hydrocarbon group; and metal selected from among Li, Na, K, Rb, Cs, Mg, Ca, Sr, Ba, Mn, Fe, Co, Ni, Cu, Zn, and Pb.

Examples of the saturated hydrocarbon group include a linear saturated hydrocarbon group such as a methyl group or an ethyl group; and a branched saturated hydrocarbon group such as an isopropyl group or an isobutyl group. Examples of the chain unsaturated hydrocarbon group include an alkenyl group in which one hydrogen atom is removed from an arbitrary carbon atom of the saturated hydrocarbon group. Examples of the alicyclic hydrocarbon group include a cycloalkyl group such as a cyclohexyl group. Examples of the aromatic hydrocarbon group include an aryl group such as a phenyl group or a benzyl group.

From the viewpoints of the solubility in the urethane curable composition and the efficiency of the catalyst, it is preferable that the hydrocarbon group is a linear saturated hydrocarbon group having 1 to 11 carbon atoms such as a methyl group, a heptyl group, or a undecyl group or is a chain unsaturated hydrocarbon group including an alkenyl group having 2 to 17 carbon atoms.

On the other hand, from the viewpoints of the solubility in the urethane curable composition and the efficiency of the catalyst, it is preferable that the metal is an alkali metal such as Li, Na, K, Rb, or Cs or is a transition metal such as Fe, Mn, Co, Ni, Cu, Zn, or Pb. Further, from the viewpoints of environmental safety and the working life (so-called pot life) of the curable composition, it is more preferable that the metal is an alkali metal such as Li, Na, K, Rb, or Cs.

From the viewpoints of the solubility in the urethane curable composition, the efficiency of the catalyst, environmental safety, and the pot life of the curable composition, it is preferable that the metal carboxylate is a linear saturated fatty acid alkali metal salt such as sodium acetate, potassium acetate, potassium octoate, potassium oleate, rubidium acetate, cesium acetate, or potassium laurate or is a branched unsaturated fatty acid alkali metal salt such as sodium oleate or potassium oleate.

The mixing amount of the catalyst used in the present invention is within a range of 0.1 wt % to 2.0 wt % and preferably 0.2 wt % to 1.7 wt % with respect to the mixing amount of the silica particles (d) described below. When the mixing amount of the catalyst is less than 0.1 wt % with respect to the mixing amount of the silica particles, a curing reaction may not progress sufficiently. On the other hand, when the mixing amount of the catalyst is more than 2.0 wt % with respect to the mixing amount of the silica particles, the working life becomes extremely short, and thus workability and storage stability deteriorate, which may affect the performance of the cured composition.

(b) Polyol

As the polyol used in the present invention, a well-known polyol can be used, for example, a hydroxyl group compound having two or more hydroxyl groups in one molecule. Examples of the polyol include a low-molecular polyol such as ethanediol, propanediol, 1,4-butanediol, 1,6-hexanediol, cyclohexyldimethanol, methylpropanediol, neopentylglycol, butyl ethyl propanediol, glycerin, trimethylolethane, trimethylolpropane, polycaprolactone triol, ditrimethylolpropane, pentaerythritol, polycaprolactone tetraol, dipentaerythritol, sorbitol, or mannitol; an ether polyol obtained by causing an alkylene polyol such as ethylene glycol or propylene glycol and an alkylene oxide such as ethylene oxide or propylene oxide to react with each other; a polyester polyol by causing a polycarboxylic acid such as maleic acid or phthalic acid and an alkylene polyol such as ethylene glycol or propylene glycol to react with each other; a polycarbonate diol obtained by causing an alkylene carbonate such as ethylene carbonate or trimethylene carbonate and an alkylene polyol such as ethylene glycol or 1,3-propanediol to react with each other; and a homopolymer of a hydroxyl group-containing acrylic monomer such as 2-hydroxyethyl(meth)acrylate or hydroxypropyl (meth)acrylate, and a copolymer of the hydroxyl group-containing acrylic monomer and a radically polymerizable unsaturated monomer such as acrylic acid or styrene. Among these, one kind may be used alone, or a mixture of two or more kinds may be used.

In the present invention, the mixing amount of the polyol (b) is within a range of 5 wt % to 90 wt %, preferably 7 wt % to 85 wt %, and more preferably 10 wt % to 75 wt % with respect to the total weight of the components (b) to (d). When the mixing amount is within the above-described range, for example, a cured product obtained by curing the curable composition can exhibit flexibility and hardness. In addition, when the mixing amount of the polyol is less than 5 wt %, a resin component is insufficient in a cured product, and the flexibility of the cured product may not be sufficiently exhibited. On the other hand, when the mixing amount of the polyol is more than 90 wt %, the amount of a resin component in a cured product increases, and the hardness may not be sufficiently exhibited.

(c) Polyisocyanate

As the polyisocyanate used in the present invention, a well-known polyisocyanate can be used, for example, a bifunctional or higher polyfunctional isocyanate. Examples of the bifunctional isocyanate include hexamethylene diisocyanate, dicyclohexyl methane diisocyanate, isophorone diisocyanate, 1-3-bis(isocyanatomethyl)cyclohexane, and 4,4-dicyclohexyl diisocyanate. Modified products of the above-described diisocyanates may also be used, and examples thereof include products synthesized from the above-described diisocyanates, such as, biurets, trimethylolpropane adducts, isocyanurates, and allophanates. In addition, blocked isocyanates of the above-described diisocyanates may also be used. Among these, one kind may be used alone, or a mixture of two or more kinds may be used.

In the present invention, the polyisocyanate is added such that an equivalence ratio (NCO/OH) of the isocyanate groups of the polyisocyanate to the hydroxyl groups of the polyol is 0.25 to 5.0. The equivalence ratio is within a range of preferably 0.5 to 3.0 and more preferably 0.8 to 2.0. When the mixing amounts satisfy the above-described range, the crosslinking density of a cured product increases, and thus, for example, durability can be implied to the cured product. In addition, when the mixing amount of the polyisocyanate is less than 0.25, some of the hydroxyl groups in the polyol remain inert. As a result, the durability of a cured product such as water resistance or weather resistance may deteriorate. In addition, when the mixing amount of the polyisocyanate is more than 5.0, some of the isocyanate groups in the polyisocyanate remain inert. As a result, even in this case, the durability such as water resistance or weather resistance may also deteriorate. In this specification, the equivalence ratio (NCO/OH) of the isocyanate groups of the polyisocyanate to the hydroxyl groups of the polyol refers to a ratio of the total number of NCO groups of the polyisocyanate to the total number of OH groups of the polyol in the curable composition.

(d) Silica Particles

The silica particles used in the present invention have a primary particle size of 1 nm to 500 nm. Silica refers to fumed silica, colloidal silica, or amorphous silica. Examples of commercially available silica particles include Aerosil R-972 and Aerosil R-200 manufactured by Degussa. Examples of a commercially available product of silica particles (silica sol) dispersed in an organic solvent include products manufactured by Nissan Chemical Industries, Ltd., for example, methanol-dispersed silica sol (trade name: MA-ST), isopropanol-dispersed silica sol (trade name: IPA-ST), n-butanol-dispersed silica sol (trade name: NBA-ST), ethylene glycol-dispersed silica sol (trade name: EG-ST), xylene/butanol-dispersed silica sol (trade name: XBA-ST), ethyl cellosolve-dispersed silica sol (trade name: ETC-ST), butyl cellosolve-dispersed silica sol (trade name: BTC-ST), dimethylformamide-dispersed silica sol (trade name: DBF-ST), dimethylacetamide-dispersed silica sol (trade name: DMAC-ST), methyl ethyl ketone-dispersed silica sol (trade name: MEK-ST), methyl isobutyl ketone-dispersed silica sol (trade name: MIBK-ST), and ethyl acetate-dispersed silica sol (trade name: EAC-ST). Among these, one kind may be used alone, or a mixture of two or more kinds may be used.

In the present invention, the mixing amount of the silica particles (d) is within a range of 5 wt % to 85 wt % and preferably 10 wt % to 80 wt % with respect to the total weight of the components (b) to (d). When the mixing amount is within the above-described range, for example, the hardness of a cured product can be improved due to the above addition effect. In addition, when the mixing amount of the silica particles is less than 5 wt %, hardness may not be imparted to a cured product. On the other hand, when the mixing amount of the silica particles is more than 85 wt %, a ratio of the silica particles in a cured product increases. Therefore, the flexibility of the cured product may decrease.

In the present invention, the curable composition may be diluted with a diluent solvent, for example, in order to adjust the solid content of the curable composition. As the diluent solvent, an organic solvent such as an alcohol solvent, a carboxylate solvent, a ketone solvent, an amide solvent, an ether solvent, or an aliphatic or aromatic hydrocarbon solvent may be used. Examples of the alcohol solvent include methanol, isopropanol, n-butanol, diacetone alcohol, 2-methoxyethanol(methyl cellosolve), 2-ethoxyethanol (ethyl cellosolve), 2-butoxyethanol(butyl cellosolve), and tertiary amine alcohol. Examples of the carboxylate solvent include ethyl acetate, n-propyl acetate, butyl acetate, and butyl formate. Examples of the ketone solvent include methyl ethyl ketone, methyl isobutyl ketone, acetone, and cyclohexanone. Examples of the amide solvent include dimethylformamide and dimethylacetamide. Examples of the ethyl solvent include diethyl ether, methoxytoluene, 1,2-dimethoxyethane, 1,2-dibutoxyethane, 1,1-dimethoxymethane, 1,1-dimethoxyethane, 1,4-dioxane, and tetrahydrofuran. Examples of the aliphatic or aromatic hydrocarbon solvent include hexane, pentane xylene, toluene, and benzene. Among these organic solvents, one kind may be used alone, or two or more kinds may be used in combination.

The composition according to the present invention is cured by heating. The heating temperature varies depending on, for example, the kind and amount of the catalyst and the kind and amount of the solvent, but is typically 40° C. to 200° C., preferably 60° C. to 150° C., and more preferably 75° C. to 130° C. In addition, when a substrate is a commodity plastic such as an acrylic resin or a polycarbonate resin, in general, heating is performed at a thermal deformation temperature or lower. For example, typically, the heating temperature of an acrylic resin is 80° C.

The curable composition according to the present invention can be prepared by uniformly mixing the catalyst (a), the polyol (b), the polyisocyanate (c) and the silica particles (d) in the organic solvent. In addition, optionally, other various additives which are commonly used in the chemical industry and the like may be used in an appropriate amount within a range not impairing the effects of the present invention, and examples of the additives include an ultraviolet absorber, an antioxidant, a defoaming agent, a leveling agent, a rheology control agent, a viscosity modifier, a matting agent, a light stabilizer, a dye, and a pigment.

The curable composition according to the present invention can be used as, for example, an adhesive, a profiling agent, a vibration isolator, a damping material, a soundproof material, a foaming material, a paint, or a spraying material.

EXAMPLES

Hereinafter, the present invention will be described in detail using Examples and Comparative Examples. However, the present invention is not limited to these examples.

Synthesis Example 1

A cooling tube and a stirrer were attached to a three-necked eggplant shaped flask, 44.4 g of diacetone alcohol (DAA) was put into the flask and was cooled to 85° C. while being stirred in a nitrogen atmosphere. A mixture of 13.3 g of DAA, 8.0 g of 2-hydroxyethyl methacrylate (61.5 mmol), 16.6 g of methyl methacrylate (165.8 mmol), and 0.18 g of a polymerization initiator (PERHEXYL PV manufactured by NOF Corporation, solid content: 70%) was added dropwise for 2 hours, and the reaction was further continued for 2 hours. Next, the solution was cooled to room temperature. As a result, an acrylic copolymer (solid content: 30%, number average molecular weight: 60,700, weight average molecular weight: 122,300, theoretical hydroxyl value: 140 mg·KOH/g) was obtained.

Each component used in Examples and Comparative Examples is as follows.
<(a) Catalyst>
Various catalysts shown in Table 2
<(b) Polyol>
b-1: Acrylic copolymer of Synthesis Example 1 (solid content: 30%, theoretical hydroxyl value: 140 mg·KOH/g)
b-2: Polycarbonate diol (solid content: 100%, hydroxyl value: 56 mg·KOH/g, number average molecular weight: 2,000, DURANOL G3452 manufactured by Asahi Kasei Chemicals Corporation)
<(c) Polyisocyanate>
c-1: Isocyanurate of hexamethylene diisocyanate (solid content: 100%, NCO content: 23.0%, DURANATE TPA100 manufactured by Asahi Kasei Chemicals Corporation)
c-2: Biuret of hexamethylene diisocyanate (solid content: 100%, NCO content: 23.5%, DURANATE 24A100 manufactured by Asahi Kasei Chemicals Corporation)
<(d) Silica Particles>
d-1: Methyl isobutyl ketone-dispersed silica sol (solid content: 30%, average particle size: 10 nm to 20 nm, MIBK-ST manufactured by Nissan Chemical Industries, Ltd.)
d-2: Ethyl acetate-dispersed silica sol (solid content: 30%, average particle size: 10 nm to 20 nm, EAC-ST manufactured by Nissan Chemical Industries, Ltd.)
<Diluent Solvent>
Methyl isobutyl ketone/diacetone alcohol=1/1 (weight ratio)

Mixing of Examples 1 to 28 and Comparative Examples 1 to 21

The above-described components (a), (b), and (d) and the diluent solvent were mixed with each other at a ratio shown in Table 1, and the mixture was sufficiently stirred. The solubility of the catalyst was evaluated by visual inspection using a method described below. Next, the component (c) was added at a ratio shown in Table 1, and the mixture was sufficiently stirred. Then, the consumption rate of isocyanate groups and the catalytic activity were evaluated using a method described below. The results of each test are shown in Table 2.

(Solubility of Catalyst)

Before adding the component (c) to each curable composition, the solubility of the catalyst in the curable composition was evaluated by visual inspection as follows.
A: Completely dissolved
B: Partially not dissolved
C: Gelling (Consumption Rate of Isocyanate Group and Catalytic Activity)

Several drops of each curable composition were applied to a silicon wafer (2 cm×2 cm, manufactured by Silicon Technology Co., Ltd.), and an infrared absorption spectrum was measured using a transmission method before and after heating under predetermined conditions (A: 115° C.×20 min, B: 150° C.×20 min). In order to minimize the effect of the C—H stretching peak intensity of the solvent before heating, nitrogen was blown to volatilize the solvent. As a result, a dry coating film was obtained, and an infrared absorption spectrum thereof was measured. The consumption rate of isocyanate (NCO) groups was obtained based on the following equation (2) using the N=C=O antisymmetric stretching peak intensity at 2270 cm$^{-1}$ and the C—H stretching peak intensity at 2952 cm$^{-1}$. In addition, the catalytic activity of each composition was evaluated as follows based on the obtained NCO group consumption rate.

$$\text{NCO Group Consumption Rate}=100-(\text{CH Peak Intensity Ratio before Curing/CH Peak Intensity Ratio after Curing})\times 100 \quad \text{equation (2)}$$

Evaluation of Catalytic Activity
A: The NCO consumption rate was 80% or higher under Condition A
B: The NCO consumption rate was 55% or higher and lower than 80% under Condition A
C: The NCO consumption rate was lower than 55% under Condition A (Pot Life)

Each curable composition was left to stand at 30° C., and the state thereof was observed by visual inspection after a predetermined time, and the pot life of the curable composition was evaluated as follows.

Evaluation of Pot Life
A: No gelling for 8 hours or longer
B: No gelling for shorter than 3 hours and gelling for shorter than 8 hours
C: Gelling for shorter than 3 hours

TABLE 1

| Mixing Components | | | Examples 1 to 20 | 21 | 22 | 23 | 24 | 25 | 26 | 27 | 28 | Comparative Examples 1, 2 | 3 to 21 |
|---|---|---|---|---|---|---|---|---|---|---|---|---|---|
| (b) Polyol (g) | b-1 | Solid Content | 26.6 | | | | | 35.9 | 12.2 | 26.6 | 26.8 | 26.6 | 26.6 |
| | | Solvent | 62.2 | | | | | 83.8 | 28.5 | 62.62 | 62.6 | 62.2 | 62.2 |
| | b-2 | Solid Content | | 75.0 | 58.3 | 33.3 | 16.7 | | | | | | |
| (c) Polyisocyanate (g) | c-1 | Solid Content | 13.4 | 15.0 | 11.7 | 6.7 | 3.3 | 4.1 | 27.8 | 13.4 | | 13.4 | 13.4 |
| | c-2 | Solid Content | | | | | | | | | 13.2 | | |
| (d) Silica Particles (g) | d-1 | Solid Content | 60.0 | 10.0 | 30.0 | 60.0 | 80.0 | 60.0 | 60.0 | | 60.0 | 60.0 | 60.0 |
| | | Solvent | 140.0 | 23.3 | 70.0 | 140.0 | 186.7 | 140.0 | 140.0 | | 140.0 | 140.0 | 140.0 |
| | d-2 | Solid Content | | | | | | | | 60.0 | | | |
| | | Solvent | | | | | | | | 140.0 | | | |
| Total Solid Content of (b) + (c) + (d) | | | 100.0 | 100.0 | 100.0 | 100.0 | 100.0 | 100.0 | 100.0 | 100.0 | 100.0 | 100.0 | 100.0 |
| Diluent Solvent (g) | | | 31.2 | 210.0 | 163.3 | 93.3 | 46.7 | 9.5 | 64.9 | 31.2 | 30.7 | 31.2 | 31.2 |
| Subtotal (g) | | | 333.3 | 333.3 | 333.3 | 333.3 | 333.3 | 333.3 | 333.3 | 333.3 | 333.3 | 333.3 | 333.3 |
| (1) OH (mmol) of Polyol (b) | | | 66.5 | 74.8 | 58.2 | 33.3 | 16.6 | 89.6 | 30.4 | 66.5 | 67.0 | 66.5 | 66.5 |
| (2) NCO (mmol) of Polyisocyanate | | | 73.1 | 82.3 | 64.0 | 36.6 | 18.3 | 22.4 | 152.2 | 73.1 | 73.7 | 73.1 | 73.1 |
| (2)/(1) | | | 1.1 | 1.1 | 1.1 | 1.1 | 1.1 | 0.3 | 5.0 | 1.1 | 1.1 | 1.1 | 1.1 |
| (a) Catalyst (g) | | Solid Content | 0.33 | 0.17 | 0.18 | 0.33 | 0.47 | 0.33 | 0.33 | 0.13 | 0.99 | 0.00 | 0.33 |
| Solid content of (a)/Solid Content of (d) (wt %) | | | 0.56 | 1.65 | 0.58 | 0.56 | 0.58 | 0.55 | 0.56 | 0.22 | 1.65 | 0.00 | 0.56 |
| Total (g) of (a) to (d) + Diluent Solvent | | | 333.7 | 333.5 | 333.5 | 333.7 | 333.8 | 333.7 | 333.7 | 333.5 | 334.3 | 333.3 | 333.7 |

TABLE 2

| | Catalyst | Compositional Formula | Solubility of Catalyst | Heating Condition | NCO Group Consumption Rate | Catalytic Activity | Pot Life |
|---|---|---|---|---|---|---|---|
| Example 1 | Lithium Benzoate | C6H5COOLi | A | A | 91.7% | A | A |
| Example 2 | Sodium Acetate | CH3COONa | A | A | 99.7% | A | A |
| Example 3 | Sodium Octoate | C7H15COONa | A | A | 98.2% | A | A |
| Example 4 | Sodium Laurate | C11H23COONa | A | A | 88.1% | A | A |
| Example 5 | Potassium Oleate | C17H33COOK | A | A | 83.7% | A | A |
| Example 6 | Rubidium Acetate | CH3COORb | A | A | 96.8% | A | A |
| Example 7 | Cesium Acetate | CH3COOCs | A | A | 84.7% | A | A |
| Example 8 | Magnesium Acetate Tetrahydrate | Mg(CH3COO)2•4H2O | A | A | 71.4% | B | A |
| Example 9 | Calcium Octoate | Ca(C7H15COO)2 | B | A | 58.0% | B | A |
| Example 10 | | | | B | 87.0% | | A |
| Example 11 | Strontium Octoate | Sr(C7H15COO)2 | B | A | 61.6% | B | A |
| Example 12 | | | | B | 87.7% | | A |
| Example 13 | Barium Oleate | Ba(C17H33COO)2 | A | A | 75.4% | B | A |
| Example 14 | Manganese (II) Octoate | Mn(C7H15COO)2 | A | A | 88.5% | A | C |
| Example 15 | Iron (III) Laurate | Fe(C11H23COO)3 | A | A | 89.2% | A | B |
| Example 16 | Cobalt (II) Oleate | Co(C17H33COO)2 | A | A | 97.7% | A | C |
| Example 17 | Nickel (II) Oleate | Ni(C17H33COO)2 | A | A | 90.3% | A | C |
| Example 18 | Copper (II) Laurate | Cu(C11H23COO)2 | A | A | 98.8% | A | C |
| Example 19 | Zinc (II) Oleate | Zn(C17H33COO)2 | A | A | 88.9% | A | C |
| Example 20 | Lead (II) Oleate | Pb(C17H33COO)2 | A | A | 99.0% | A | C |
| Example 21 | Sodium Acetate | CH3COONa | A | A | 90.1% | A | A |
| Example 22 | | | A | A | 99.1% | A | A |
| Example 23 | | | A | A | 95.2% | A | A |
| Example 24 | | | A | A | 83.2% | A | A |
| Example 25 | | | A | A | 99.7% | A | A |
| Example 26 | | | A | A | 98.3% | A | A |
| Example 27 | | | A | A | 98.3% | A | A |
| Example 28 | | | A | A | 99.7% | A | A |
| Comparative Example 1 | None | — | — | A | 8.6% | — | A |
| Comparative Example 2 | | | | B | 12.9% | | |
| Comparative Example 3 | Aluminum (III) Laurate | Al(C11H23COO)3 | B | A | 14.2% | C | A |
| Comparative Example 4 | | | | B | 52.9% | | |
| Comparative Example 5 | Aluminum (III) Oleate | Al(C17H33COO)3 | B | A | 25.0% | C | A |
| Comparative Example 6 | | | | B | 42.6% | | |
| Comparative Example 7 | Yttrium (III) Octoate | Y(C7H15COO)3 | A | A | 43.7% | C | A |
| Comparative Example 8 | | | | B | 75.5% | | |
| Comparative Example 9 | Zirconium (IV) Octoate | Zr(C7H15COO)4 | A | A | 27.1% | C | A |
| Comparative Example 10 | | | | B | 58.6% | | |
| Comparative Example 11 | Zirconium (IV) Laurate | Zr(C11H23COO)2O | B | A | 17.7% | C | A |
| Comparative Example 12 | | | | B | 57.1% | | |
| Comparative Example 13 | Tin (II) Octylate | Sn(C7H15COO)2 | B | A | 27.4% | C | C |
| Comparative Example 14 | | | | B | 77.4% | | |
| Comparative Example 15 | Tin (II) Laurate | Sn(C11H23COO)4 | A | A | 29.6% | C | A |
| Comparative Example 16 | | | | B | 73.5% | | |
| Comparative Example 17 | Dibutyltin (IV) Dilaurate | (C4H9)2Sn(C11H23COO)2 | A | A | 42.8% | C | A |
| Comparative Example 18 | | | | B | 77.8% | | |
| Comparative Example 19 | Dimethyltin (IV) Dilaurate | (CH3)2Sn(C11H23COO)2 | A | A | 44.6% | C | A |
| Comparative Example 20 | | | | B | 79.8% | | |
| Comparative Example 21 | 1,4-Diazabicyclo[2.2.2]octane | N1(CC2)CCN2CC1 | C | — | — | — | — |

According to the results of Table 2, in the urethane curable composition of each of Examples, isocyanate groups were able to be consumed at a high consumption rate under curing conditions: a thermal deformation temperature or lower of a commodity plastic molded article; and a short period of time of several tens of minutes. In addition, the urethane curable compositions containing an alkali metal or an alkali earth metal as the catalyst had a longer pot life than that of the urethane curable compositions containing a transition metal as the catalyst. On the other hand, in the urethane curable composition of each of Comparative Examples, the consumption rate of isocyanate groups was low under conditions of a low temperature and a short period of time, and the curing reaction was not able to progress sufficiently.

The invention claimed is:

1. A urethane curable composition comprising:
a catalyst (a);
polyol (b) having two or more hydroxyl groups in one molecule;
a polyisocyanate (c) having two or more isocyanate groups in one molecule; and
silica particles (d), wherein the catalyst (a) is a metal carboxylate represented by a formula (1):

M(OCOR)n     (1)

where M represents Li, Na, K, Rb, or Cs; R represents any one of a saturated hydrocarbon group having 1 to 20 carbon atoms, a chain unsaturated hydrocarbon group, an alicyclic hydrocarbon group, and an aromatic hydrocarbon group; and n represents the same number as the valence of M, wherein the polyol (b) comprises a (meth) acrylic-based polymer having a hydroxyl group, wherein the polyisocyanate (c) comprises a modified product of a bifunctional isocyanate, wherein the modified product of the bifunctional isocyanate comprises at least one selected from the group consisting of biurets, trimethylolpropane adducts, isocyanurates, and allophanates, wherein the silica particles (d) are silica sol dispersed in an organic solvent, a content of the polyol (b) is 5 wt % to 85 wt % and a content of the silica particles (d) is 10 wt % to 85 wt % with respect to the total weight of the components (b) to (d), the polyisocyanate (c) is added such that the equivalence ratio (NCO/OH) of the isocyanate groups of the polyisocyanate (c) to the hydroxyl groups of the polyol (b) is 0.25 to 5.0, and a content of the catalyst (a) is 0.1 wt % to 2.0 wt % with respect to the content of the silica particles (d).

2. The urethane curable composition according to claim 1, wherein the polyol (b) further comprises at least one selected from the group consisting of ethanediol, propanediol, 1,4-butanediol, 1,6-hexanediol, cyclohexyldimethanol, methylpropanediol, neopentylglycol, butyl ethyl propanediol, glycerin, trimethylolethane, trimethylolpropane, ditrimethylolpropane, pentaerythritol, dipentaerythritol, sorbitol, mannitol, and a polycarbonate diol.

3. The urethane curable composition according to claim 1, wherein the bifunctional isocyanate is at least one selected from the group consisting of hexamethylene diisocyanate, dicyclohexyl methane diisocyanate, isophorone diisocyanate, 1-3 -bis(isocyanatomethyl) cyclohexane, and 4,4-dicyclohexyl diisocyanate.

4. The urethane curable composition according to claim 1, wherein the catalyst (a) is at least one selected from the group consisting of lithium benzoate, sodium acetate, sodium octoate, sodium laurate, sodium oleate, potassium acetate, potassium octoate, potassium laurate, potassium oleate, rubidium acetate, and cesium acetate.

* * * * *